United States Patent [19]

Chen et al.

[11] 3,917,572
[45] Nov. 4, 1975

[54] RESINOUS POLYBARBITURIC ACID DERIVATIVES

[75] Inventors: Augustin T. Chen, Cheshire; William J. Farrissey, Jr., Northford, both of Conn.

[73] Assignee: The Upjohn Company, Kalamazoo, Mich.

[22] Filed: Nov. 1, 1974

[21] Appl. No.: 519,924

[52] U.S. Cl. .......... 260/77.5 R; 8/192; 260/29.2 TN; 260/30.4 N; 260/32.6 N; 427/12; 428/425
[51] Int. Cl.². C08G 18/30; C08G 18/82; C08J 3/06
[58] Field of Search.......... 260/77.5 R, 77.5 TB, 257

[56] References Cited
UNITED STATES PATENTS
3,597,410   8/1971   Lieske et al. .................. 260/77.5 R
3,821,098   6/1974   Garratt et al. ...................... 260/257

*Primary Examiner*—H. S. Cockeram
*Attorney, Agent, or Firm*—Denis A. Firth; John Kekich

[57] ABSTRACT

Novel polymers are described which are characterized by the recurring unit

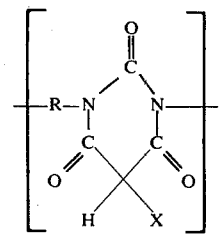

where R is the residue of an organic diisocyanate and X is cyano, nitro, halo, alkanoyl, aroyl, carbalkoxy. The polymers form alkali metal salts. These polymers are useful in the preparation of coatings, adhesives, and the like. Copolymers which contain the above recurring unit are also disclosed.

9 Claims, No Drawings

RESINOUS POLYBARBITURIC ACID DERIVATIVES

BACKGROUND OF THE INVENTION

1. Field of the Invention

This invention relates to novel polymers and is more particularly concerned with novel polybarbituric acid derivatives and with processes for their preparation.

2. Description of the Prior Art

Although many monomeric barbituric acids have been described and investigated, particularly those barbituric acids which have been found to possess therapeutic properties, no polymers derived from such compounds have been described hitherto. The monomer most closely related to the polymeric barbiturates herein described is 1,3-diphenyl-5-carbethoxybarbituric acid; Chemische Berichte 106, 312, 1973.

SUMMARY OF THE INVENTION

This invention comprises polymers characterized by the recurring unit:

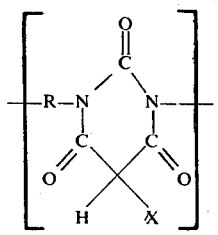

(I)

wherein R is the residue of an organic diisocyanate having the formula OCN—R—NCO and X is selected from the group consisting of cyano, lower-alkanoyl, lower-carbalkoxy, aroyl, nitro and halo. The invention also comprises the alkali metal and alkaline earth metal derivatives of said polymers. The invention also comprises copolymers having the above recurring unit in the chain thereof.

The term "lower alkanoyl" means the acyl radical derived from an alkanoic acid having from 2 to 6 carbon atoms. Illustrative of lower-alkanoyl are acetyl, propionyl, butyryl, pentanoyl, hexanoyl, and isomeric forms thereof.

The term "lower-carbalkoxy" means the radical —COOR$_1$ wherein R$_1$ is alkyl from 1 to 6 carbon atoms such as methyl, ethyl, propyl, butyl, pentyl, hexyl, and isomeric forms thereof.

The term "aroyl" means the acyl radical derived from an aromatic hydrocarbon carboxylic acid having from 7 to 14 carbon atoms, inclusive. Illustrative of aroyl are benzoyl, toluoyl, dimethylbenzoyl, naphthoyl, phenylbenzoyl, and the like.

The term "halo" is inclusive of chloro, bromo, fluoro, and iodo.

The term "alkali metal" is inclusive of sodium, potassium and lithium.

The term "alkaline earth metal" is inclusive of calcium, barium and strontium.

The polymers characterized by the recurring unit (I) are useful for a variety of purposes. Illustratively, the polymers having the recurring unit can be formulated and used as coatings and adhesives. The polymers of the invention have the advantage of high resistance to degradation by heat and are resistant to attack by a wide variety of chemicals and solvents as well as being resistant to abrasive action. These properties, together with excellent electrical insulating properties, make them especially useful for coating electrical conductors.

DETAILED DESCRIPTION OF THE INVENTION

The polymers of the invention having the recurring unit (I) are prepared in accordance with the following reaction scheme

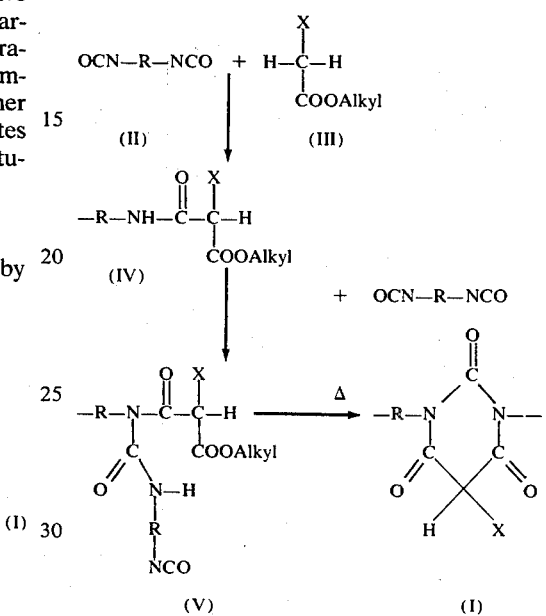

In the above formulae R and X have the significance hereinbefore defined and Alkyl is alkyl from 1 to 6 carbon atoms as exemplified hereinabove. For the sake of simplicity of representation, the intermediates (IV) and (V) are not shown fully, but the result of the interaction between the alkyl ester (III) and only one of the two isocyanato groups in the starting diisocyanate (II) is shown. It will be appreciated and understood that the same reaction occurs in respect of the second isocyanato group and the dotted line which appears to the left of the radical R in the above formulae (IV) and (V) serves to indicate this.

The above sequence of reactions can be carried out in a single continuous operation or, if desired, the reaction product (IV) derived in the first step can be isolated and, if desired, purified, before being submitted to the subsequent steps of the processes. Many of the compounds of formula (IV) are already known in the art and some have been prepared by alternative procedures to the one shown above. Accordingly, it is within the scope of the present invention to derive the polymers having the recurring unit (I) by starting with the compound of formula (IV), which has been performed by the procedure shown above or by some other procedure, and reacting this compound with diisocyanate (II) in accordance with the second and third steps depicted in the above reaction scheme.

If the intermediate (IV) is prepared in accordance with the above reaction scheme, the diisocyanate (II) and the alkyl ester (III) are reacted in approximately stoichiometric proportions in the presence of a basic catalyst. Advantageously, the temperature at which the reaction is conducted is within the range of about 20°C to about 150°C and preferably within the range of about 50°C to about 110°C. An inert organic solvent can be employed if desired but is generally found to be unnecessary. Examples of inert solvents which can be employed optionally are diethyl ether, tetrahydrofuran, diglyme, benzene, toluene, and the like.

The basic catalysts employed in the above process can be inorganic bases or tertiary amines. Illustrative of tertiary amine bases are trimethylamine, triethylamine, N-methyldiethylamine, N-methylpiperidine, N,N-dimethylaniline, N-methyl-N-propylaniline, N,N'-dimethylpiperazine, N-methylpyrrolidine, N-methylmorpholine, N-ethylmorpholine, N,N,N',N'-tetramethylbutanediamine, pyridine, quinoline, triethylenediamine, and the like; N,N-dimethylcyclohexylamine, N-methyl-N-ethylcyclohexylamine, N,N-dipropylcyclohexylamine, N,N-dimethylbenzylamine, N,N-diethylbenzylamine; N,N',N''-trialkylaminoalkylhexahydrotriazines such as N,N',N''-tris(dimethylaminomethyl)hexahydrotriazine, N,N',N''-tris(dimethylaminopropyl)hexahydrotriazine, N,N',N''-tris(diethylaminoethyl)hexahydrotriazine, and the like; and mono-, di- and tri-(dialkylaminoalkyl)phenols such as 2-(dimethylaminomethyl)phenol, 2-(dimethylaminobutyl)phenol, 2,4-bis(dimethylaminomethyl)phenol, 2,4-bis(dipropylaminoethyl)-phenol, 2,4,6-tris(dimethylaminoethyl)phenol, 2,4,6-tris(dimethylaminobutyl)phenol, and the like. Illustrative of inorganic bases are alkali metals, their hydroxides and carbonates and alkaline earth metals, their hydroxides and carbonates.

Advantageously, the amount of catalyst employed is of the order of about 1 percent to about 10 percent by weight based on diisocyanate but higher or lower amounts can be used in certain cases depending upon the activity of the catalyst and the nature of the alkyl ester (III).

The reaction of the intermediate (IV) with diisocyanate (II) in the second stage of the above reaction scheme is, like the first step, also carried out at elevated temperatures of the order set forth above, and in the presence of a tertiary amine base catalyst: supra. However, it is desirable that this second stage reaction be carried out in the presence of a solvent. The latter can be any of the inert organic solvents set forth above, but is preferably an aprotic dipolar solvent such as N-methylpyrrolidone, N,N-dimethylformamide, N,N-dimethylacetamide, o-cresol, p-cresol, commercial mixtures of cresol, and the like.

In addition to the use of a solvent, the reaction is also preferably carried out in the absence of air or oxygen, i.e. in the presence of an inert gas such as nitrogen, argon, xenon, and the like. Advantageously, the intermediate (IV) and the diisocyanate (II) are employed in approximately stoichiometric amounts but the diisocyanate (II) can be present in excess as will be discussed hereinafter in regard to the preparation of copolymers. The resulting intermediate (V) can be isolated from the reaction mixture by conventional procedures, e.g. by precipitation, evaporation of the solvent, and the like, and also purified by recrystallization, chromatography and like techniques, if so desired. However, in most instances, the intermediate (V) is converted directly, without isolation, to the desired polymer having the recurring unit (I). The conversion is effected readily and conveniently by heating the reaction product containing the intermediate (V) to a temperature within the range of about 100°C to about 200°C. The heating is continued until the polymerization is complete, an end point which can be determined by routine analytical techniques such as infrared spectroscopy, magnetic resonance spectroscopy, viscosity determinations and the like.

The resulting polymer having the recurring unit (I) can be isolated in conventional manner, for example, by pouring the reaction mixture into a non-solvent for the polymer such as benzene, toluene, hexane, methanol, water and the like.

As mentioned previously, the preparation of the polymers of the invention having the recurring unit of formula (I) can be prepared directly from the diisocyanate (II) and the alkyl ester (III) in a single operation without isolation of any of the intermediates (IV) and (V). Thus, the diisocyanate (II) and the alkyl ester (III), in molar proportions of at least 2:1, are brought together in the presence of a solvent and a base catalyst, supra, under the conditions of temperature previously described and, when the conversion to the intermediate (V) is substantially complete as indicated by appropriate analytical techniques, the temperature of the reaction mixture is raised to the level set forth above as appropriate for polymerization of the intermediate (V).

Similarly, one may start with one of the known intermediates (IV) and proceed directly to the polymer having the recurring unit (I) without pausing to isolate the intermediate (V).

The polymers having the recurring unit (I) and prepared by any of the procedures set forth above, generally have a molecular weight within the range of about 4,000 to about 40,000. A preferred group are those polymers which are prepared from 4,4'-methylenebis(phenyl isocyanate) and either ethyl cyanoacetate, ethyl chloroacetate or diethylmalonate and having a molecular weight within the range of about 10,000 to about 30,000.

If desired, the properties of the polymers of the invention having the recurring unit (I) can be modified by incorporating into the reaction mixture [either starting from the diisocyanate (II) and the alkyl ester (III) or from the preformed intermediate (IV)] other reactive hydrogen containing compounds, for example, polyols (including both polyester and polyether polyols commonly employed in the art of preparing polyurethane elastomers), polyamines, alkanolamines and the like, which are commonly employed in the polyurethane art. Preferably, the amount of such other active hydrogen containing materials introduced in the above way does not exceed an amount corresponding to that necessary to reduce the proportion of total units of formula (I) to less than 50 percent by weight.

Similarly, there can also be included in the reaction mixture employed to prepare the polymers of the invention various additives such as pigments, fire retardants, inert fillers, and the like.

It will be appreciated by one skilled in the art that, if one prepares the polymers of the invention using the preformed intermediate (IV) as one of the starting materials it is possible to react this with a diisocyanate (II) which differs from the one used to prepare the intermediate (IV). In this way one obtains a polymer of the invention in which there are two different units corresponding to formula (I), the R group in one series of units being different from the R group in the other units.

The organic diisocyanates (II) which are employed in the preparation of the polymers of the invention can be any of the organic diisocyanates known in the art. Illustrative of such diisocyanates are 2,4-toluene diisocyanate, 2,6-toluene diisocyanate, 4,4'-methylenebis(phenyl isocyanate), 2,4'-methylenebis(phenyl isocyanate), dianisidine diisocyanate, tolidine diisocyanate, hexamethylene diisocyanate, m-xylylene diisocyanate, 1,5-naphthalene diisocyanate, p-phenylene diisocyanate, 1,4-diethylbenzene-$\beta,\beta'$-diisocyanate, and the like. Mixtures of two or more of the above diisocyanates can be used, such as mixtures of the 2,4 and 2,6-toluene diisocyanates, mixtures of the 2,4'- and 4,4'-methylenebis(phenyl isocyanate) and the like.

In addition to the various isomers of the methylenebis(phenyl isocyanate) and mixtures of these isomers, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of the latter. For example, the polyisocyanate (II) can be methylenebis(phenyl isocyanate) which has been converted to a stable liquid form in accordance with the process of U.S. Pat. No. 3,384,653. Illustrative of another form of modified methylenebis(phenyl isocyanate) is the product obtained by treating 4,4'-methylenebis(phenyl isocyanate) or mixtures thereof with the 2,4'-isomer, with a minor proportion of a carbodiimide such as diphenyl carbodiimide in accordance with the process described in British Patent 918,454.

In addition to the diisocyanates illustrated above, the organic isocyanates (II) employed in the preparation of the polymers of the invention include the isocyanate-terminated prepolymers obtained by reacting an excess of any of the polyisocyanates discussed above with a difunctional polyol. The difunctional polyols employed in making the isocyanate-terminated prepolymers can be any of those conventionally employed in the art for this purpose. Advantageously, said polyols have an hydroxy equivalent weight of about 30 to about 2,000.

The polyols can be monomeric or polymeric and the latter can be polyesters or polyethers. Illustrative of the polyether polyols are polyoxyalkylene glycols such as polytetramethylene glycol, the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene oxypropylene glycols prepared in a similar manner utilizing a mixture of ethylene oxide or propylene oxide or a sequential addition of ethylene oxide and 1,2-propylene oxide; and polyether glycols prepared by reacting ethylene oxide, propylene oxide, or mixtures thereof with mono- and polynuclear dihydroxybenzene, e.g. catechol, resorcinol, hydroquinone, orcinol, 2,2-bis(p-hydroxyphenyl)propane, bis(p-hydroxyphenyl)methane and the like.

Illustrative of polyester polyols are those prepared by polymerizing $\epsilon$-caprolactone using an initiator such as ethylene glycol, ethanolamine and the like, and those prepared by esterification of polycarboxylic acids such as phthalic, terephthalic, succinic, glutaric, adipic acids and the like with dihydric alcohols such as ethylene glycol, propylene glycol, butanediol, and the like.

In preparing the isocyanate-terminated prepolymers the proportion of isocyanate groups to hydroxyl groups is advantageously within the range of about 1.5:1 to about 5:1 and preferably in the range of about 1.8:1 to 3:1. In accordance with procedures well recognized in the art the isocyanate-terminated prepolymers are readily prepared by bringing the isocyanate and polyol together, advantageously at elevated temperatures of the order of about 50°C or higher, and allowing the reaction to continue until free hydroxyl groups can no longer be detected in the mixture. Routine analytical techniques such as infrared spectroscopy can be used to determine this end point.

Illustrative of the alkyl esters (III), which are known compounds and can be prepared by methods well-known in the art are the methyl, ethyl, propyl, butyl and hexyl esters of chloracetic acid, cyanoacetic acid, fluoroacetic acid, bromoacetic acid, iodoacetic acid, nitroacetic acid, acetoacetic acid, 3-ketohexanoic acid, 3-ketooctanoic acid, malonic acid, benzoylacetic acid, toluoylacetic acid, $\beta$-naphthoylacetic acid and the like.

The polymers of the invention having the recurring unit (I) are characterized by outstanding resistance to heat, to attack by solvents and common chemicals, and to erosion by abrasive forces. They are particularly useful as protective coatings for a variety of substrates and, by reason of their electrical insulating properties, as coatings for electrical conductors. When used as coatings, the polymers of the invention are dissolved in a suitable solvent such as dimethylformamide, dimethylacetamide, N-methylpyrrolidone, and the like, and the resulting solutions (to which may be added conventional coating additives, pigments and the like) are applied to substrates such as metals, ceramics, glass or synthetic fibers, fabrics and the like. The coated substrate is then treated, for example by heating or stoving, to remove the solvent and cure the coating.

The polymers of the invention are also useful as adhesives and in the preparation of laminates for use in fabricating structural materials. The laminates are prepared by conventional procedures, for example, by impregnating a series of layers of fiberglass or like reinforcing material and molding the layers under appropriate conditions of temperature and pressure to prepare the laminate.

The polymers having the recurring unit (I) can, by virtue of the acidic hydrogen atom attached to the same ring atom as the substituent X, form salts in the same ways as monomeric barbituric acids. For example, the polymers of the invention, can be reacted, advantageously in solution in one of the inert solvents hereinabove described, with an alkali metal or alkaline earth metal or a derivative thereof such as the hydride, alkoxide and the like to form the corresponding alkali metal or alkaline earth metal salts of said polymers. By employing the appropriate proportion of alkali metal, or alkaline earth metal or derivative thereof, to polymer it is possible to replace only one, or some, or all of the acidic hydrogen atoms in the polymer (I) by alkali metal or alkali earth metal ions. When only a minor proportion, of the order of five percent, of the acidic hydrogen atoms in the polymer molecule are replaced by alkali metal or alkaline earth metal ions, there is obtained an ionomer having substantially enhanced physical properties as compared with the starting polymer. When substantially all of the acidic hydrogen atoms are replaced by alkali metal or alkaline earth metal ions, the resulting polymer is soluble in water and the resulting solution can be used, for example, in the electrolytic coating of metals and the like by known techniques.

The following examples describe the manner and process of making and using the invention and set forth the best mode contemplated by the inventors of carrying out the invention but are not to be construed as limiting.

EXAMPLE 1

A mixture of 33.5 g. (0.134 mole) of diphenylmethane 4,4'-diisocyanate, 42.9 g. (0.268 mole) of diethyl malonate and 1.3 g. of triethylamine was heated with stirring in a dry nitrogen atmosphere for 4 hours at 150°C. To this mixture was then added 33.5 g. (0.134 mole) of diphenylmethane 4,4'-diisocyanate in 80 ml. of N-methylpyrrolidone. The solution so obtained was heated at 200°C for 3 hours. During the heating, a total of 60 ml. of N-methylpyrrolidone was added to reduce the viscosity of the solution. The solution was then poured into toluene and the polymer collected and dried. The polymer had an inherent viscosity of 0.28 in dimethylformamide (0.5 g/dl, 30°C). It exhibited absorption maxima at 5.73, 5.96 and 6.07 microns. This polymer was characterized by a recurring unit of the following formula:

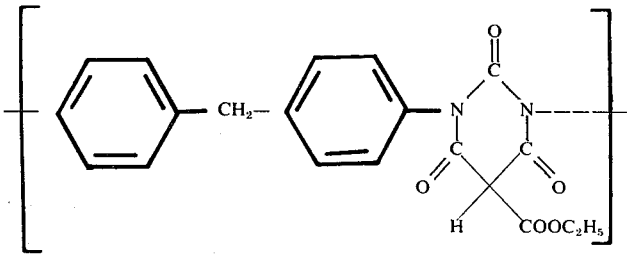

EXAMPLE 2

A solution of 14.5 g. (0.025 mole) of diphenylmethane 4,4'-bis($\alpha$,$\alpha$-dicarbethoxyacetamide) (see U.S. Pat. No. 2,826,526), 6.3 g. (0.025 mole) of diphenylmethane 4,4'-diisocyanate and 1 g. of triethylamine in 35 ml. of N-methylpyrrolidone was heated with stirring in a dry nitrogen atmosphere for 3 hours at 150°C and 3 hours at 180°C consecutively. The solution was then poured into toluene and the polymer collected and dried. The polymer had an inherent viscosity of 0.32 in dimethylformamide (0.5 g/dl, 30°C). The infrared absorption spectrum exhibited absorption maxima, characteristically, at 5.73, 5.96 and 6.07 microns. The polymer product was characterized by having the following repeating unit:

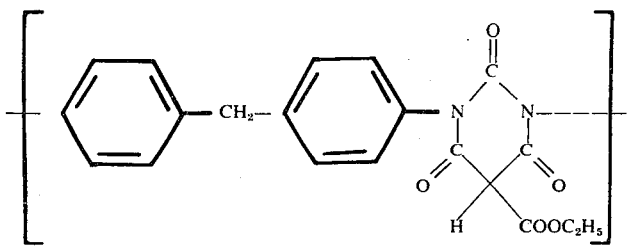

EXAMPLE 3

A solution of 12 g. (0.025 mole) of diphenylmethane 4,4'-bis($\alpha$-carbethoxy-$\alpha$-cyanoacetamide) (U.S. Pat. No. 2,826,526), 6.3 g. (0.025 mole) of diphenylmethane 4,4'-diisocyanate, and 1.25 g. of triethylamine in 45 ml. of N-methylpyrrolidone was heated with stirring in a dry nitrogen atmosphere for 3 hours at 150°C. After the third hour, the temperature was raised to 180°C and the solution heated for another 3 hours. The solution was then poured into methanol to precipitate the polymer. The precipitated polymer was collected and dried, and found to have an inherent viscosity of 0.41 in dimethylformamide (0.5 g/dl, 30°C). The infrared absorption spectrum exhibited absorption maxima, characteristically, at 4.49, 5.86, 6.12 microns. The polymer product was characterized by having the following repeating unit:

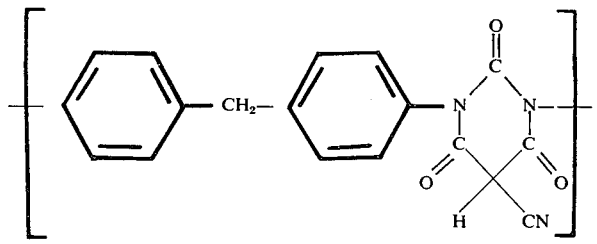

EXAMPLE 4

A solution of 15.3 g. (0.03 mole) of diphenylmethane 4,4'-bis($\alpha$-carbethoxyacetoacetamide) (U.S. Pat. No. 2,826,526), 7.5 g. (0.03 mole) of diphenylmethane 4,4'-diisocyanate and 1.2 g. of N,N-dimethylcyclohexylamine in 45 ml. of N-methylpyrrolidone was heated with stirring in a dry nitrogen atmosphere for 3 hours at 150°C and 3 hours at 180°C. The solution was then poured into toluene and the precipitated polymer collected and dried. It had an inherent viscosity of 0.15 and exhibited absorption maxima at 5.86 and 6.03 microns. The polymer product was characterized by the following repeating unit:

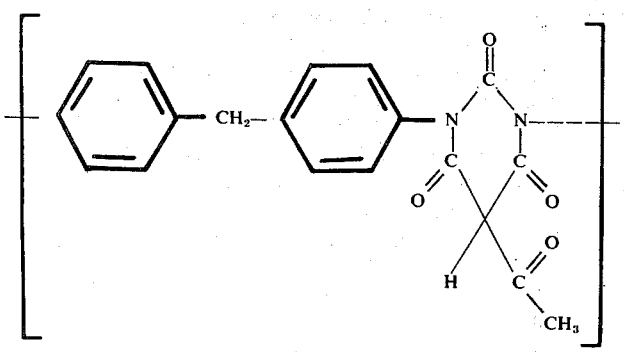

EXAMPLE 5

Using the procedure described in Example 1 but replacing diethylmalonate by an equivalent proportion of ethyl benzoylacetate, there was obtained a polymer characterized by the recurring unit

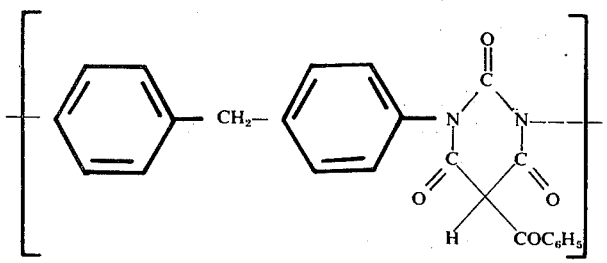

Similarly, using the procedure described in Example 1, but replacing the diethylmalonate there used by an equivalent amount of ethyl chloroacetate and ethyl nitroacetate there were obtained the corresponding polymers having the recurring unit (I) wherein R in both cases represented

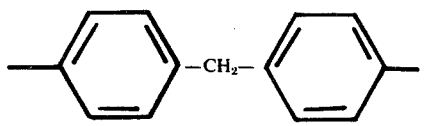

and X represented chloro and nitro, respectively.

EXAMPLE 6

Using the procedure described in Example 1 but replacing diphenylmethane-4,4'-diisocyanate by an equivalent amount of 2,6-toluene diisocyanate, there was obtained the corresponding polymer characterized by a recurring unit of the formula:

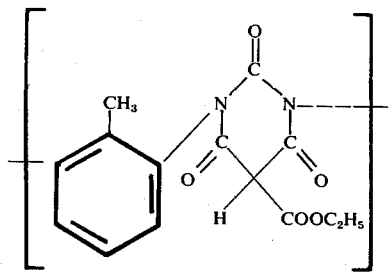

EXAMPLE 7

Using the procedure described in Example 2, but replacing the diphenylmethane-4,4'-diisocyanate by an equivalent amount (0.025 mole) of 2,6-toluene diisocyanate there was obtained a polymer containing substantially equal proportions of recurring units having the formulae:

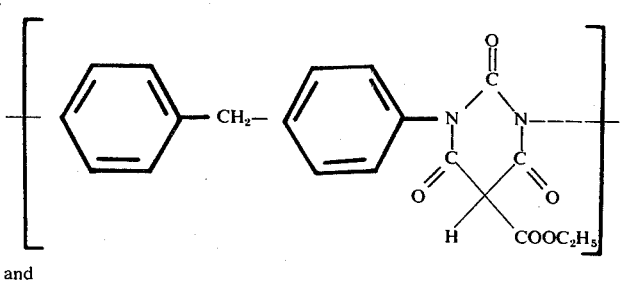

and

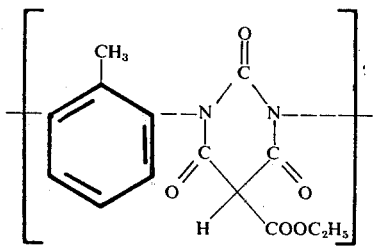

We claim:
1. A polymer characterized by the recurring unit:

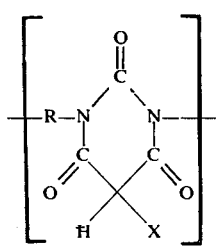

wherein R is the residue of an organic diisocyanate having the formula OCN—R—NCO selected from the group consisting of 2,4-toluene diisocyanate, 2,6-toluene diisocyanate, 4,4'-methylenebis(phenyl isocyanate), 2,4'-methylenebis(phenyl isocyanate), dianisidine diisocyanate, tolidine diisocyanate, hexamethylene diisocyanate, m-xylylene diisocyanate, 1,5-naphthalene diisocyanate, p-phenylene diisocyanate, 1,4-diethylbenzene-β,β'-diisocyanate, and mixtures of two or more of said diisocyanates, and X is selected from the group consisting of cyano, lower-alkanoyl, lower-carbalkoxy, aroyl, nitro and halo.

2. A polymer according to claim 1 wherein R represents the residue of 4,4'-methylenebis(phenyl isocyanate).

3. A polymer according to claim 2 wherein X is cyano.

4. A polymer according to claim 2 wherein X is carbethoxy.

5. A polymer according to claim 2 wherein X is acetyl.

6. A polymer according to claim 1 wherein, in at least one of the recurring units in the molecule thereof, the hydrogen atom attached to the same carbon atom as the substituent X has been replaced by a metal ion selected from alkali metal ions and alkaline earth metal ions.

7. A process for the preparation of a polymer according to claim 1 wherein the appropriate organic diisocyanate and an ester having the formula XCH$_2$COOAlkyl, wherein X is as defined in claim 1 and Alkyl is alkyl from 1 to 6 carbon atoms, are reacted in substantially stoichiometric proportions in the presence of a base catalyst at a temperature in the range of about 20°C to about 150°C and the temperature of the reaction product is subsequently raised to a maximum of about 200°C.

8. A process for the preparation of a polymer according to claim 1 wherein the appropriate organic diisocyanate is reacted with an ester having the formula

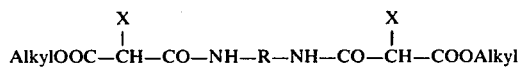

wherein R is the residue of said organic diisocyanate, X is as defined in claim 1 and Alkyl is alkyl from 1 to 6 carbon atoms, in the presence of a tertiary amine catalyst at a temperature in the range of about 100°C to about 200°C.

9. A process according to claim 8 wherein the organic diisocyanate employed in reaction with the said ester is not identical to the diisocyanate from which said ester has been derived whereby there is obtained a polymer having two different recurring units said units differing only in the identity of R.

* * * * *

UNITED STATES PATENT OFFICE
CERTIFICATE OF CORRECTION

Patent No. 3,917,572  Dated November 4, 1975

Inventor(s) Augustin T. Chen and William J. Farrissey, Jr.

It is certified that error appears in the above-identified patent and that said Letters Patent are hereby corrected as shown below:

That portion of Formula (IV) at column 2, line 20 which appears as —R—NH—

Should read: ---R—NH—.

That portion of Formula (V) at column 2, line 25 which appears as —R—N—

Should read: ---R—N—.

That portion of Formula (I) at column 2, line 25 which appears as —R—N

Should read: ---R—N.

That portion of Formula (I) at column 2, line 25 which appears as N--

Should read: N—.

Column 2, line 57:

has been perfOrmedShould read:

has been preformed

Signed and Sealed this twenty-fourth Day of February 1976

[SEAL]

Attest:

RUTH C. MASON
Attesting Officer

C. MARSHALL DANN
Commissioner of Patents and Trademarks